United States Patent
Shi et al.

[11] Patent Number: 6,137,661
[45] Date of Patent: Oct. 24, 2000

[54] SYSTEM FOR PROVIDING A MAGNETORESISTIVE HEAD HAVING HIGHER EFFICIENCY

[75] Inventors: Xizeng Shi, Union City; Hua-Ching Tong, San Jose; Ming Zhao; Francis Liu, both of Fremont, all of Calif.

[73] Assignee: Read-Rite Corporation, Milpitas, Calif.

[21] Appl. No.: 09/174,469

[22] Filed: Oct. 19, 1998

[51] Int. Cl.[7] .................................................. G11B 5/39
[52] U.S. Cl. ............................................................ 360/321
[58] Field of Search ..................................... 360/113, 321

[56] References Cited

U.S. PATENT DOCUMENTS 5,909,344  6/1999  Gill ........................................... 360/113
5,930,084  7/1999  Dovek et al. ............................ 360/113

*Primary Examiner*—Robert S. Tupper
*Attorney, Agent, or Firm*—Nathan N. Kallman

[57] ABSTRACT

A system and method for providing a head for reading data is disclosed. The method and system include providing a magnetoresistive element and providing a flux guide having a high resistivity. The magnetoresistive element has an end. The flux guide also has an end. The end of the flux guide is adjacent to the end of the magnetoresistive element.

4 Claims, 4 Drawing Sheets

6,137,661

SYSTEM FOR PROVIDING A MAGNETORESISTIVE HEAD HAVING HIGHER EFFICIENCY

FIELD OF THE INVENTION

The present invention relates to magnetic recording technology and more particularly to a method and system for improving the magnitude of the signal provided by a magnetoresistive head.

BACKGROUND OF THE INVENTION

Currently, some magnetic recording technology utilizes magnetoresistive ("MR") heads in order to read data stored on a magnetic recording media, such as a disk. Conventional MR heads include a conventional MR element which has a resistivity that depends upon the magnetization of the MR element. Such heads also include electronics which translate the change in resistivity of the MR element into a signal that indicates the state of a bit being read.

Generally, conventional MR elements utilize one of two physical phenomenon to read the state of a bit magnetically stored on the disk. Anisotropic magnetoresistive ("AMR") elements rely on the change in resistivity of a material as the direction of magnetization in the material changes. A giant magnetoresistive ("GMR") element depends upon the scattering at an interface within the GMR element. Typically, this interface is between non-magnetic and magnetic layers in a multilayer structure. GMR is typically significantly greater than AMR.

Irrespective of the physical phenomenon used in the conventional MR element, the magnitude of the signal provided by the conventional MR head in response to the magnetization of a bit depends upon several parameters. The magnitude of the signal is proportional to the sheet resistance of the conventional MR element and to the efficiency of the conventional MR element. The efficiency is the average magnetic flux through the MR element divided by the maximum flux through the MR element. The magnitude of the signal is also proportional to the current driving the conventional MR element.

A trend in magnetic recording technology is to higher density storage. In order to increase the density of data storage, the length and width of each bit are made smaller. As each bit is made smaller, the effect of the bit's magnetic field on the MR element is reduced for a variety of reasons. Consequently, the magnitude of the signal provided by the MR head decreases. As the magnitude of the signal provided by the MR head decreases, the MR head may become incapable of reading the data stored on the disk.

Accordingly, what is needed is a system and method for improving the ability of a magnetoresistive head to adequately read information stored in a magnetic recording media. The present invention addresses such a need.

SUMMARY OF THE INVENTION

The present invention provides a method and system for providing a head for reading data. The method and system comprise providing a magnetoresistive element and providing a flux guide having a high resistivity. The magnetoresistive element has an end. The flux guide also has an end. The end of the flux guide is adjacent to the end of the magnetoresistive element.

According to the system and method disclosed herein, the present invention increases the amount of magnetic flux passing through the end of the magnetoresistive element without shunting current away from the magnetoresistive element, thereby increasing efficiency of the magnetoresistive head. As a result, the magnitude of the signal provided by the present invention is increased.

DETAILED DESCRIPTION OF THE INVENTION

The present invention relates to an improvement in magnetic recording technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1A:
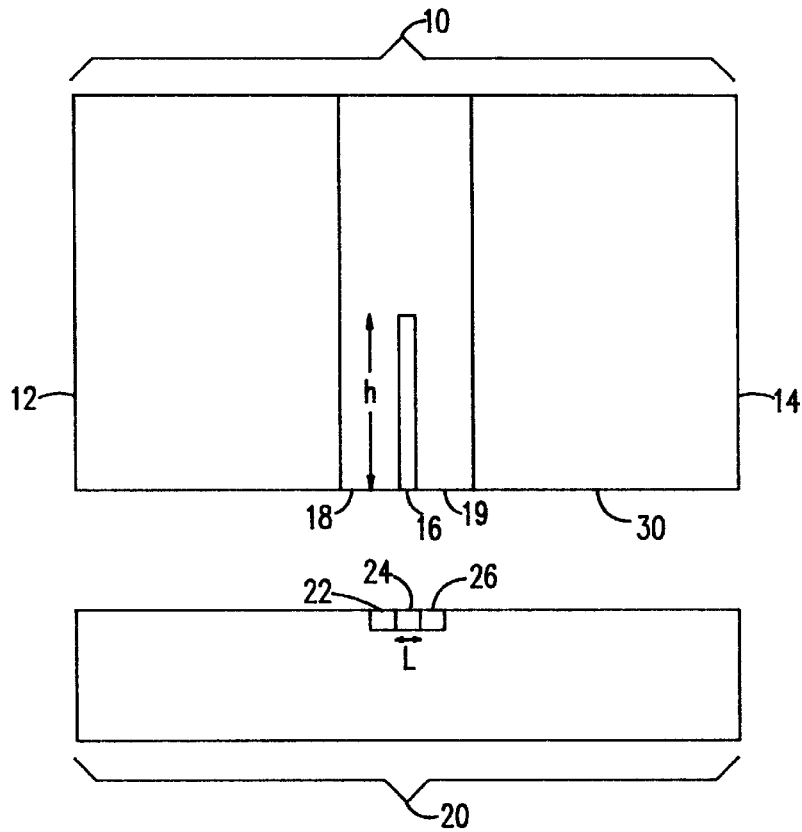
FIG. 1A is a block diagram depicting a side view of a portion of a conventional magnetic recording system.
Figure 1B:
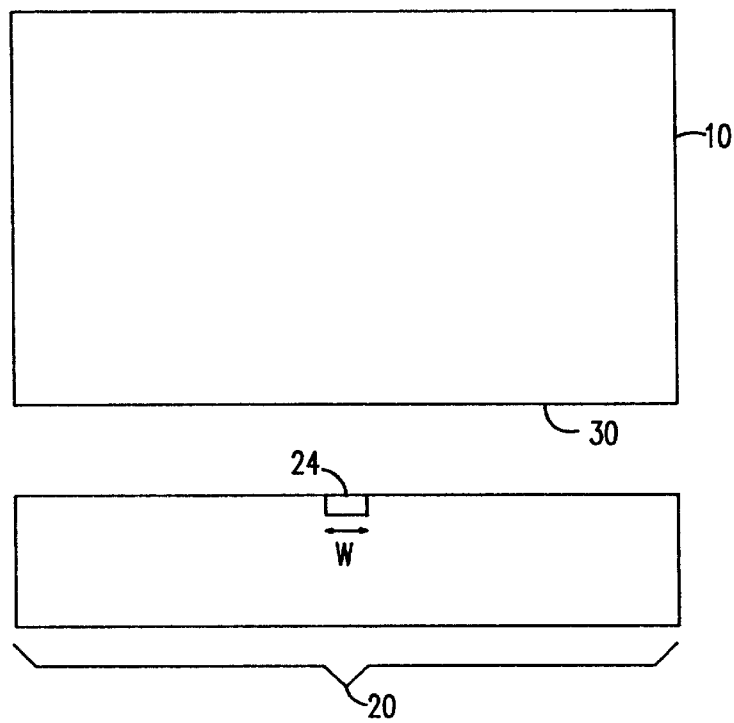
FIG. 1B is a block diagram depicting a front view of a portion of a conventional magnetic recording system.

FIGS. 1A and 1B are block diagrams of a conventional magnetoresistive ("MR") head 10 and a recording media 20, such as a disk. FIG. 1A depicts a side view of the conventional MR head 10 and recording media 20. The conventional MR head 10 has an air bearing surface 30 facing the recording media 20. Three bits 22, 24, and 26 in a track on the disk 20 are depicted. Each bit 22, 24, and 26 has a length L. The conventional MR head 10 includes magnetic shields 12 and 14, as well as a conventional MR element 16. The conventional MR element 16 has a height h and is separated from the shields 12 and 14 by gaps 18 and 19. The conventional MR element 16 may be an anisotropic magnetoresistive ("AMR") element or a giant magnetoresistive ("GMR") element. The conventional MR head 10 is shown reading the bit 24. The shields 12 and 14 shield the conventional MR element 16 from the magnetic fields of the bits 22 and 26 which are not currently being read. FIG. 1B depicts a front view of the conventional MR head 10 and the recording media 20. Only the bit 24 of the recording media 20 is depicted. The bit 24 has a width W.

Figure 2:
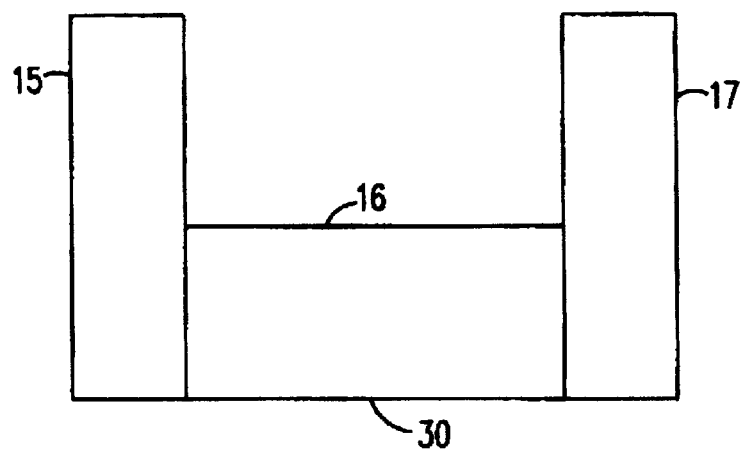
FIG. 2 is a block diagram depicting a conventional magnetoresistive element.

FIG. 2 depicts a portion of the conventional MR head 10. The conventional MR element 16 is electrically connected to leads 15 and 17. Current flows through one lead 15 to the conventional MR element 16 and returns via lead 17. This current allows a change in the resistance of the conventional MR element 16 to be measured. The change in resistance of the conventional MR element 16 is due to the magnetic field generated by the magnetization of the bit 24 being read. Using this change in resistance of the conventional MR element 16, the data stored in the bit 24 can be read.

Magnetic flux generated by the magnetization of the bit 24 passes through the conventional MR element 16. Because of the geometry of the conventional MR head 10, the end of the conventional MR element 16 farthest from the air bearing surface 30 has essentially no magnetic flux passing through it. The end of the conventional MR element 16 closest to the air bearing surface 30 has the maximum magnetic flux passing through it. Magnetic flux exits the conventional MR element 16 through the sides of the conventional MR element 16. Consequently, the magnetic flux is a maximum at the end of conventional MR element 16 closest to the air bearing surface 30, rapidly decreases along the height of the conventional MR element 16, and drops to zero at the end of the conventional MR element 16 farthest from the air bearing surface 30.

The efficiency of the conventional MR element 16 depends on the amount of magnetic flux passing through the conventional MR element 16. The efficiency can be defined as the average magnetic flux through a surface parallel to the air bearing surface 30 along the height of the conventional MR element 16 divided by the maximum magnetic flux. This maximum magnetic flux is the magnetic flux through the end of conventional MR element 16 closest to the air bearing surface 30. Because of the variation of the magnetic flux along the height of the conventional MR element 16, the efficiency of the conventional MR element 16 is on the order of fifty percent.

The magnitude of the signal provided by the conventional MR head 10 in response to the magnetization of the bit 24 is related to the efficiency and other properties of the conventional MR element 16, the geometry of the conventional MR head 10, and the geometry of the recording media 20. The magnitude of the signal is proportional to the efficiency and the resistance of the conventional MR element 16. The magnitude of the signal is also proportional to the fractional change in resistance of the conventional MR element 16 due to a magnetic field. The magnitude of the signal is proportional to the current driving the conventional MR element 16. The magnitude of the signal is also proportional to the maximum magnetic flux through the conventional MR element 16. The magnitude of the signal is inversely proportional to the height of the conventional MR element and to the width w of bits 22, 24, and 26 (FIG. 1B).

Although the conventional MR head 10 can generate a signal in response to the magnetic field of a bit in the recording media 20, one of ordinary skill in the art will realize that it is desirable to store data at a higher density. Thus, it is desirable for the bits 22, 24, and 26 to be made smaller. Typically, both the length L of each bit 22, 24, and 26 and the width W of each bit 22, 24, and 26 are reduced. As the length and width of bits 22, 24, and 26 are decreased, the magnitude of the signal generated by the conventional MR element 16 decreases. The magnitude of the signal may become too small for disk drive electronics (not shown) to adequately decode the change in resistance of the conventional MR element 16 to determine a state of the bit 22, 24, or 26 being read.

For example, as the length L of each bit 22, 24, or 26 is reduced, the magnetic fields generated by the bits 22, 24, and 26 overlap more. The shields 12 and 14 are brought closer to the conventional MR element 16 to reduce the effect of the magnetic fields generated by the bits 22 and 26 not being read. However, as the gaps 18 and 19 are made smaller, the shields 12 and 14 also prevent a larger portion of the magnetic field from the bit 24 from reaching the MR element 16. As a result, the magnetic flux through the conventional MR element 16 is reduced.

The change in resistance of the MR element 16 is proportional to the magnetic flux through the MR element 16. Because there is less magnetic flux through the conventional MR element 16, the change in resistance of the conventional MR element 16 due to the magnetic field of the bit 24 will also be reduced. Consequently, the magnitude of the signal generated by the conventional MR head 10 is reduced. When the magnitude of this signal becomes too small, the conventional MR head 10 will not be able to read data stored by the recording media 20.

Similarly, the magnitude of the signal is proportional to the resistance of the conventional MR element 10 and the current driving the conventional MR element 10. If the resistance of the conventional MR element 16 or the current driving the conventional MR element 16 decreases, the magnitude of the signal also decreases. Even if the fractional change in resistance of the conventional MR element 16 due to a bit 24 being read is constant, the magnitude of this change in resistance is smaller. Consequently, the information stored in the recording media 20 more difficult to read.

The present invention provides a method and system for providing a head that reads data. The method and system comprise providing a magnetoresistive element and providing a flux guide having a high resistivity. The magnetoresistive element has an end. The flux guide also has an end. The end of the flux guide is adjacent to the end of the magnetoresistive element. Consequently, efficiency of the magnetoresistive element may be improved and the magnitude of the signal provided by the magnetoresistive element increased.

The present invention will be described in terms of a particular head and a certain material used to provide the flux guide. However, one of ordinary skill in the art will recognize that this method and system will operate effectively for other heads and other types of flux guides. Similarly, one of ordinary skill in the art will also realize that the present invention will function when other suitable materials are used.

Figure 3:
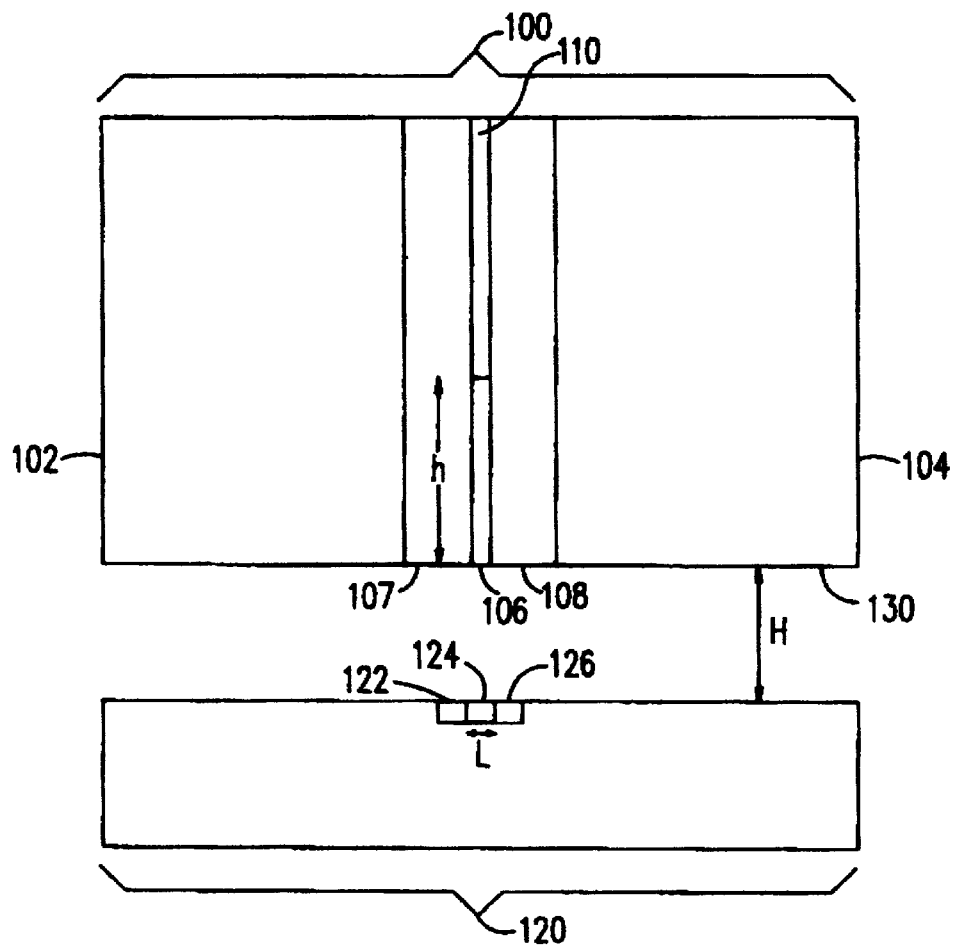
FIG. 3 is a block diagram of a magnetic recording system in accordance with the present invention.

To more particularly illustrate the method and system in accordance with the present invention, refer now to FIG. 3 depicting a block diagram of one embodiment of such a system. The system includes an MR head 100 in accordance with the present invention and a recording media 120. The recording media 120 is shown storing bits 122, 124, and 126 in a particular track. However, the recording media 120 preferably stores a larger number of bits in a plurality of tracks. As depicted in FIG. 3, the MR head 100 is in position to read the bit 124. The MR head 100 has an air bearing surface 130 facing the recording media 120.

The MR head 100 in accordance with the present invention includes a first shield 102, a second shield 104, an MR element 106, and a flux guide 110. The flux guide 110 has a relatively high resistivity and is made of a magnetically soft material. The MR element 106 and the flux guide 110 are separated from the first shield 102 and the second shield 104 by gaps 107 and 108, respectively. In a preferred embodiment, the MR element 106 is a GMR element. Consequently, the MR element 106 is preferably a multilayer structure having alternating magnetic and non-magnetic metal layers. Also in a preferred embodiment, the MR element 106 has three layers, two magnetic layers separated by a non-magnetic layer. A flying height H between the air bearing surface 130 and the recording media 120 is also preferably small enough to bring the MR element 106 close to the recording media 120. This increases the magnetic flux through the MR element 106 and, therefore, the magnitude of the signal generated by the MR element head 100.

Figure 4:
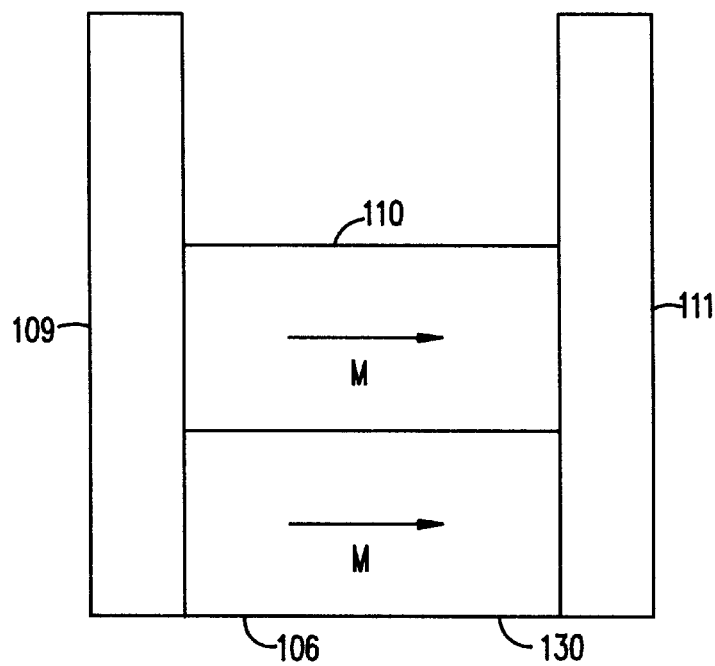
FIG. 4 is a block diagram of a magnetoresistive element and flux guide in accordance with the present invention.

FIG. 4 depicts one embodiment of a portion of the MR head 100 in accordance with the present invention. The MR element 106 and the flux guide 110 are electrically connected to leads 109 and 111. Current flows through one lead 109 to the MR element 106 and returns via lead 111. This current allows a change in the resistance of the MR element 106 to be measured. The MR element 106 and the flux guide 110 are also adjacent, with the end of the MR element 106 farthest from the air bearing surface 130 being next to the end of the flux guide 110 that is closest to the air bearing surface 130.

Referring to FIGS. 3 and 4, because of the geometry of the MR head 100, the end of the flux guide 110 far from the air bearing surface 130 has no magnetic flux passing through it. However, magnetic flux does pass through the end of the MR element 106 far from the air bearing surface 130. Magnetic flux enters the MR element 106 through the end of the MR element closest to the air bearing surface 130. Because the flux guide 110 is magnetically soft, lines of magnetic flux can easily pass through the flux guide 110. As a result, at least a portion of the flux entering the MR element 106 passes through the end of the MR element 106 far from the air bearing surface 130 and into the flux guide 110. Consequently, a larger amount of flux is retained in the MR element 106 because of the flux guide 110.

Figure 5:
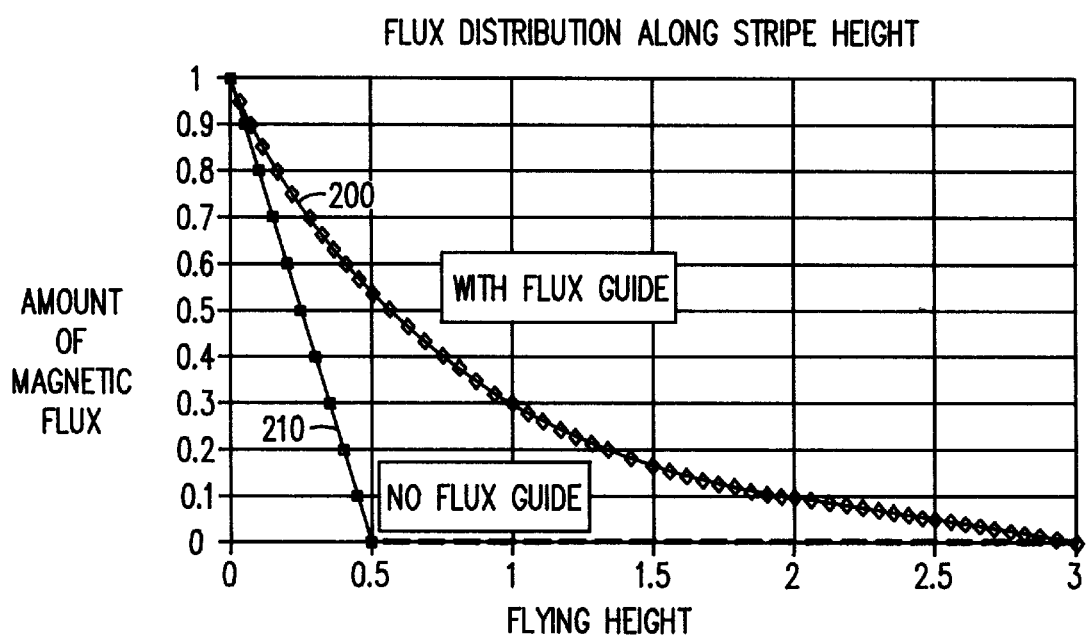
FIG. 5 is a graph depicting the magnetic flux through a conventional magnetoresistive element and the magnetic flux through a magnetoresistive element in a magnetoresistive head made in accordance with the present invention.

FIG. 5 depicts graphs of the normalized magnetic flux in the MR element 106 and the conventional MR element 16 versus flying height H from the media 120 and 20, respectively. The magnetic flux is normalized to the maximum flux present at the air bearing surface 130. Curve 200 depicts the normalized magnetic flux versus distance from the air bearing surface 130 for the MR head 100 in accordance with the present invention. Curve 210 depicts the normalized magnetic flux versus distance from the air bearing surface 30 for the conventional MR head 10. For the curve 200 and the curve 210, the height of the MR element 106 and conventional MR element 16, respectively, is 0.5 micrometers. In addition, the other parameters of the MR heads 100 and 10 for the curves 200 and 210, respectively, are the same.

As can be seen from the curves 200 and 210, more magnetic flux is retained in the MR element 106 versus flying height H than for the conventional MR element 16. This is because magnetic flux from the MR element 106 passes through the flux guide 110, while the magnetic flux drops to zero at the end of the conventional MR element 16.

As discussed above, the efficiency of the MR element 106 can be defined as the average magnetic flux through a surface parallel to the air bearing surface 130 along the height of the MR element 106 divided by the maximum magnetic flux. Because of the presence of the flux guide 110, more magnetic flux exists in the MR element 106 farther from the air bearing surface 130. Thus, efficiency of the MR element 106 is approximately seventy-five percent. This is significantly higher than the efficiency of the conventional MR element 16, which is approximately fifty percent.

Because of the flux guide 110 and the attendant improvement in efficiency of the MR element 106, the magnitude signal from the MR head 100 is increased. Thus, when the width W and length L of the bits 122, 124, and 126 are decreased, a higher signal from the MR element 106 can be preserved. Consequently, the MR head 100 can be used with higher density recording media 120.

In addition to allowing more magnetic flux to be retained in the MR element 106, the flux guide 110 has a relatively high resistivity. This is in contrast to other magnetically soft materials having low resistivity. In one embodiment, the flux guide 110 is made of a ferrite material. In a preferred embodiment, the flux guide 110 is a magnetically soft Ni—Zn film having a relatively high resistivity. Preparation of a Ni—Zn film is discussed in "Ni—Zn Ferrite Thin-Films Prepared by Facing Target Sputtering," Zhenghong Qian, et al, *IEEE Tran. Magn.*, Vol. 33, No. 5, September 1997, pages 3748–3750. Thus, although the flux guide 110 is magnetically soft, it also has a high resistivity.

Because the flux guide 110 has a high resistivity, the flux guide 110 does not shunt current away from the MR element 106. The flux guide 110 is electrically connected to the leads 109 and 111 in parallel with the MR element 106. The MR element 106 is preferably metallic. The resistivity of the MR element 106 is, therefore, preferably much smaller than the resistivity of the flux guide 110.

During operation, current is driven through the MR element 106 to sense a change in resistance of the MR element 106 due to the magnetic field generated by the bit 124 being read. Because the resistivity of the flux guide 110 is significantly higher than that of the MR element 106 little of this driving current is shunted away form the MR element 106 to the flux guide 110. Consequently, the current driven through the MR element 106 is substantially preserved.

The magnitude of the signal from an MR head such as the MR head 100 is proportional to the current through the MR element 106. Because the flux guide 110 has a high resistivity, the current through the MR element 106 is preserved. Therefore, the magnitude of the signal from the MR head 100 is preserved.

The flux guide 110 can increase the efficiency of the MR element 106 while preventing current from being shunted away from the MR element 106. Both the efficiency of and the current through the MR element 106 remain relatively high. Consequently, the magnitude of the signal generated by the MR head 100 in response to the magnetic field from the bit 124 may be significantly higher than the magnitude of the signal generated by the conventional MR head 10. Thus, the MR head 100 provides a greater signal even when the length and width of the bits 122, 124, and 126 are reduced. Consequently, the MR head 100 in accordance with the present invention may have better performance when used with a higher density recording media.

Also in a preferred embodiment, the magnetization of the flux guide 110 is magnetically stabilized. Magnetic stabilization of the flux guide 110 helps to protect the MR head 100 from formation of domains in the flux guide 110 or other phenomenon which might vary the operating performance of the MR head 110. For example permanent magnets (not shown) may be used to stabilize the magnetization of the flux guide 110. In a preferred embodiment, the same permanent magnets used to stabilize the magnetization of the flux guide 110 also bias the MR element 106. This is depicted by the magnetization, M, shown in the flux guide 110 and the MR element 106. Thus, the MR element 106 is preferably a GMR element, rather than an AMR element which is typically biased in a different direction.

Figure 6:
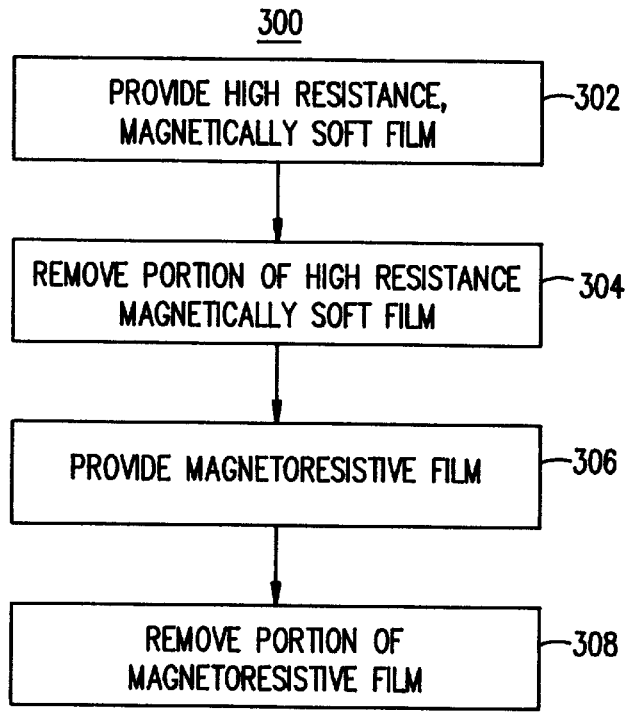
FIG. 6 is a flow chart depicting one embodiment of a method for providing a magnetoresistive head in accordance with the present invention.

FIG. 6 depicts a flow chart of one embodiment of a method 300 used for providing a flux guide 110 and an MR element 106 in accordance with the present invention. A high resistivity, magnetically soft film is deposited, via step 302. A portion of this film will make up the flux guide 110. In a preferred embodiment, step 302 includes providing a Ni—Zn ferrite film. A portion of the high resistivity, magnetically soft film is then removed, via step 304. The film is removed where the MR element 106 will be formed. Preferably, step 304 is performed by masking the portion of the film and etching the exposed portion of the film. Thus, the flux guide 110 is formed.

A MR film is then provided, via step 306. In a preferred embodiment, the MR film is a GMR film. Thus, the MR film providing step 306 preferably includes providing a multilayer structure including two magnetic layers separated by a non-magnetic layer. Also in a preferred embodiment, the MR film is provided while the mask used for etching a portion of the high resistivity, magnetically soft film is still in place. Thus, a portion of the MR film forming the MR element 106 will be deposited adjacent to the flux guide 110. Via step 308, the remaining portion of the MR film is then removed. Thus, the MR element 106 and the flux guide 110 may be fabricated.

Figure 7:
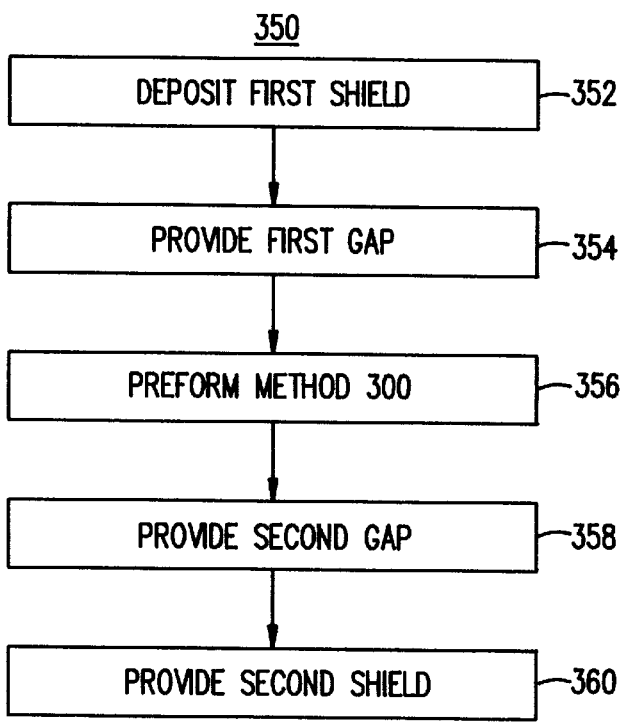
FIG. 7 is a flow chart depicting a preferred embodiment of a method for providing a magnetoresistive head in accordance with the present invention.

FIG. 7 depicts a flow chart of one embodiment of a method 350 used for providing a MR head 100 in accordance with the present invention. The first shield 104 is deposited, via step 352. The gap 108 is then provided via step 354. The flux guide 110 and MR element 106 are then formed using the method 300, in step 356. The gap 107 is then provided in step 358 and the second shield 102 provided via step 360.

The method 350 is preferred because the method 350 can be performed in conjunction with one normal fabrication process used to fabricate the MR head 100. In addition, the methods 300 and 350 are preferred for forming the MR element 106 and flux guide 110. This is because the flux guide 110 is preferably provided prior to formation of the MR element 106. In a preferred embodiment, the ferrite film for the flux guide 110 is formed at a temperature that is high compared to the temperature at which the MR element 106 is formed. The higher temperature results in improved properties of the Ni—Zn film forming the flux guide 110. When the flux guide 110 is formed prior to the MR element 106, the MR head 110 can be brought to a higher temperature for deposition of the ferrite film. As a result, a better flux guide 110 is formed. Consequently, the method 350 is a preferred method for providing the MR head 100.

A method and system has been disclosed for providing a MR head having a higher efficiency MR element in a structure in which current may not be shunted away from the MR element. Consequently, the magnitude of the signal provided by the MR head may be improved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A magnetoresistive head assembly comprising:
   an air bearing surface for interfacing with a magnetic storage medium;
   a magnetoresistive element formed with a first end at said air bearing surface and a second end; remote from said air bearing surface said ends defining the height of said magnetoresistive element, and having sides between said ends;
   a flux guide formed of a magnetically soft material having a high resistivity, said flux guide having first and second ends and sides therebetween, said first end of said flux guide being contiguous and coextensive with said second end of said magnetoresistive element, said first end of said flux guide being spaced from said air bearing surface by the height of said magnetoresistive element;
   first and second gaps formed respectively along the sides of said magnetoresistive element and the sides of said flux guide; and
   first and second shields spaced from said magnetoresistive element and said flux guide by said first and second gaps respectively;
   wherein the combined height of said magnetoresistive element and said flux guide is substantially the same as the height of each of said gaps and said shields.

2. The head of claim 1 wherein the flux guide is composed of a ferrite material.

3. The head of claim 2 wherein the ferrite material is Ni—Zn.

4. The head of claim 3 wherein the magnetoresistive element further includes a multilayer structure comprising:
   a first magnetic layer having a first magnetization;
   a second magnetic layer having a second magnetization; and
   a non-magnetic layer between the first magnetic layer and the second magnetic layer.

* * * * *